United States Patent Office 3,325,554
Patented June 13, 1967

3,325,554
PROCESS FOR THE PRODUCTION OF OLEFINES BY THE DEHYDROCHLORINATION OF ALKYL CHLORIDES
Leslie Ernest Addy, Dollar, Scotland, assignor to British Hydrocarbon Chemicals Limited, London, England, a British company
No Drawing. Filed July 9, 1963, Ser. No. 293,861
Claims priority, application Great Britain, July 26, 1962, 28,773/62; Feb. 28, 1963, 8,105/63
15 Claims. (Cl. 260—677)

The present invention relates to the production of olefines by the dehyrochlorination of alkyl chlorides.

The conversion of chlorinated normal paraffins to olefines by dehydrochlorination in the vapor phase over a catalyst is known. With many catalysts skeletal isomerisation takes place during the dehydrochlorination reaction, forming branched chain olefines, and this is disadvantageous for instance where it is desired to obtain primarily straight chain olefines, for use in the production of detergent alkylate or plasticiser alcohols.

According to the present invention the process for the production of olefines comprises bringing a chlorinated normal paraffin having from 4 to 20 carbon atoms at an elevated temperature into contact with a silica catalyst which has been pre-treated with an alkali metal compound.

The catalysts used in the process of the prsent invention include silica gel and silica/alumina catalysts. The preferred catalyst is silica gel of relatively large pore diameter, for instance silica gel having an average pore diameter over about 40 A. The caltayst is subjected to a pre-treatment with an alkali metal compound, for instance an alkali metal hydroxide, carbonate or halide. It is preferred to pre-treat the catalyst with an aqueous solution of sodium or potassium hydroxide or chloride, and the use of the potassium compounds is particularly preferred. Suitably the resulting catalyst contains between about 0.001 and 0.25 gram-equivalents of alkali metal compound per 100 grams of catalyst, and preferably between 0.01 to 0.2 gram-equivalents per 100 grams. After impregnation the catalyst is dried by heating in air, for instance to 120° C. Some carbon is deposited on the catalyst during dehydrochlorination, and this eventually deactivates the catalyst, which therefore is regenerated at intervals by heating in air or oxygen-containing gases to temperatures of not more than 550° C. to burn off the carbon.

The starting materials for the process of the present invention are chlorinated normal paraffins having from 4 to 20 carbon atoms. Fractions of chlorinated normal paraffins within the $C_9$ to $C_{18}$ carbon number range, and preferably within the $C_{10}$ to $C_{16}$ carbon number range are particularly suitable. As there is a tendency for skeletal isomerisation to occur with the more highly chlorinated feedstocks it is preferred to use chlorinated paraffin feedstocks which have been chlorinated to a relatively low degree, for example, to less than about 40% conversion to chlorinated products. When processing chlorinated feedstocks having a high chloride content, diluents inert under the dehydrochlorination conditions, such as nitrogen or the lower paraffin hydrocarbons, may be fed to the reactor. The unconverted paraffin present in a partially chlorinated product is generally a suitable diluent.

The dehydrochlorination can be carried out in the liquid phase under pressure, but it is preferred to use vapor phase conditions with temperatures in the range 200–500° C., preferably 300–400° C. The reaction is suitably carried out at pressures close to atmospheric pressure, but increased or reduced pressures may also be used.

The olefines produced by the process can be recovered using conventional means. In cases where mixtures of alkyl chlorides containing paraffins are fed to the process, and an olefine-paraffin mixture is produced, this mixture can be fed directly (if desired after removal of a very small amount of high boiling by-product which is sometimes formed) to the olefine-using reaction. The alkylation of the olefine to benzene and the conversion of the olefine to alcohols using the "oxo" process are cases where the olefin/paraffin mixture can be directly utilised in this way.

An important application of the process of the present invention is in the dehydrochlorination of chlorinated paraffins (especially chlorinated normal paraffins) in the $C_9$–$C_{18}$ range, preferably the $C_{10}$–$C_{16}$ range, to produce olefinic products suitable for alkylation to benzene to give alkylbenzenes for alkylbenzene sulphonate manufacture. In this case, the dehydrochlorination reaction product, including any paraffin not converted in the chlorination step, can be fed directly to the alkylation reaction in which the olefine is combined with benzene, and the unconverted paraffin may then be recovered from the alkylation product and returned to the chlorination. In this case the feedstock should preferably not extend over more than four carbon numbers in order to facilitate separation of unconverted paraffin from the alkyl benzene product.

The process of the invention is further illustrated with reference to the following examples.

Example 1

A sample of silica gel of the following properties

| | |
|---|---|
| Surface area _____ m.²/g__ | 300 |
| Average pore volume _____ | 1.04 |
| Pore diameter _____ | 139 |
| Sodium content _____ percent by wt__ | 0.2 | was impregnated by stirring 50 parts by weight with 75 parts by weight of water containing (in separate batches) 0.05, 0.5 and 5.0 parts of potassium hydroxide. The water was then removed by drying for 16 hours at 120° C., giving catalysts containing 0.1, 1 and 10% by weight of KOH respectively.

The three catalysts so prepared were used to dehydrochlorinate a feedstock made by chlorinating a $C_{10}$–$C_{13}$ normal paraffin fraction to a chlorine content of 3.75% by weight, the dehydrochlorination conditions being as follows:

| | |
|---|---|
| Temperature _____ ° C__ | 356 |
| Pressure _____ | Atmospheric |
| Liquid feed rate _____ vol./vol. catalyst/hour__ | 1.27 |

The three runs gave 99%, 91% and 89% dehydrochlorination of the chlorine present respectively for the catalysts containing 0.1, 1 and 10% alkali. Samples of each product were hydrogenated on a palladium oxide/charcoal catalyst at 20–60° C., by which the olefins were completely converted to paraffins. Gas chromatographic analysis of these hydrogenated products showed that only traces of branched chain compounds not present in the original feed were formed. A product obtained using silica gel catalyst without added alkali showed approximately 10–15% of branched chain paraffins when tested in this way.

Example 2

A number of alkali metal halide-impregnated silica gel catalysts were made, using a small-pore high surface area dessicant grade gel of surface area 655 sq. metres per gram, pore volume 0.60 ml./g. and average pore diameter 36 A. The gel (50 parts by weight) was stirred with sufficient of an aqueous solution of the appropriate halide just to moisten the gel completely without leaving excess free water, the solution volume required being 1.5 mls. per gm. of gel. After mixing was complete the gel was dried for one hour at 120° C. with stirring, and then heated (without stirring) overnight at 120° C. Finally the gel was heated to 200° C. for 30 minutes, and then charged to a tubular reactor. Drying was then completed in situ by passing a stream of inert gas at 390° C. over the catalyst.

Secondary chloropentane was then passed through the reactor at a rate of 0.125 volume of liquid chloropentane per volume of catalyst per hour mixed with 10 moles of inert gas per mole of chloropentane, the temperature being 380–390° C. and the pressure atmospheric. The reaction products leaving the reactor were cooled and refrigerated to condense the pentene, and the liquid products water washed to remove hydrogen chloride. The percentage of branched chain pentenes in the olefin formed was measured by gas chromatographic analysis. The results obtained by addition of sodium and potassium chloride to the catalysts are shown in Table 1. The elimination of hydrogen chloride from the chloropentane was substantially complete in all cases.

TABLE 1.—EFFECT OF ADDITION OF SODIUM AND POTASSIUM CHLORIDE TO SILICA GEL DEHYDROCHLORINATION CATALYSTS

| Catalyst | Percent of branched chain pentene in dehydrochlorination products | Cracking of $C_5$ occurring |
|---|---|---|
| Silica gel alone, no chloride added | 11.2 | Cracking occurred. |
| Silica gel with 0.007 equivs. of NaCl per 100 gms. silica. | 4.2 | |
| Silica gel with 0.02 equivs. of NaCl per 100 gms. silica. | 8.2 | |
| Silica gel with 0.09 equivs. of NaCl per 100 gms. silica. | 8.4 | |
| Silica gel with 0.007 equivs. of KCl per 100 gms. silica. | 1.2 | Slight cracking detected. |
| Silica gel with 0.02 equivs. of KCl per 100 gms. silica. | (1) | None detected. |
| Silica gel with 0.092 equivs. of KCl per 100 gms. silica. | (1) | Do. |

1 None detected.

Example 3

The catalysts of Example 2 were used to dehydrochlorinate a mixture of $C_{10}$–$C_{13}$ normal paraffins which had been chlorinated to a chlorine content of 3.75% by weight, the temperature of the dehydrochlorination being 380–395° C., the pressure atmospheric, and the liquid chloronated feed being pumped into the system at a rate of 1.25 volumes of liquid feed per volume of catalyst per hour. Significant amounts of cracking occurred with the silica gel catalyst containing no chloride; the cracking was appreciably reduced by addition of the sodium and potassium chlorides. The formation of branched chain isomers during the dehydrochlorination was also much reduced.

Example 4

A series of catalysts were prepared as in Example 2 using a large-pore silica gel of surface area 300 sq. metres per gm., pore volume 1.04 ml./gm. and average pore diameter 139 A. units. A series of processes were then carried out under the same conditions as in Example 1 in which straight chain chloropentanes were dehydrochlorinated. No significant cracking was observed in any of these processes, even in the absence of added chloride, and elimination of chlorine was substantially complete. The percentage of branched chain isomers found in the products are shown in Table 2.

TABLE 2

| Catalyst | Percent of branched chain isomers in dehydrochlorinated products |
|---|---|
| Silica gel with no added chloride | 6.5 |
| Silica gel plus 0.007 equivs. NaCl/100 gms. silica | 4.3 |
| Silica gel plus 0.065 equivs. NaCl/100 gms. silica | (1) |
| Silica gel plus 0.08 equivs. NaCl/100 gms. silica | (1) |
| Silica gel plus 0.002 equivs. KCl/100 gms. silica | 6.8 |
| Silica gel plus 0.007 equivs. KCl/100 gms. silica | 3.0 |
| Silica gel plus 0.014 equivs. KCl/100 gms. silica | (1) |
| Silica gel plus 0.02 equivs. KCl/100 gms. silica | (1) |
| Silica gel plus 0.09 equivs. KCl/100 gms. silica | (1) |

1 None detected.

Example 5

Some of the catalysts of Example 4 were used to dehydrochlorinate a mixture of $C_{10}$–$C_{13}$ normal paraffins which had been chlorinated to a chlorine content of 3.75% by weight, under the reaction conditions of Example 3. No appreciable amount of cracking was detected, but the untreated gel showed a significant amount of branched chain isomer formation. This was reduced by the addition of the chlorides. The silica gel containing 0.002 equivalent of KCl per 100 gm. silica still showed significant formation of skeletal isomers. No skeletal isomer formation could be detected in the gel containing 0.02 equivalent per 100 gm. of silica. The chloride addition did not reduce the conversion, as shown in the following figures for residual chlorine found in the liquid dehydrochlorinated product.

TABLE 3

| Catalyst | Residual chlorine in product, p.p.m. | HCl recovered percent of theory based on chlorine content of feed |
|---|---|---|
| Untreated silica gel | 670 | 97 |
| Silica gel plus 0.07 equivs. NaCl/100 gms. silica | 650 | |
| Silica gel plus 0.08 equivs. NaCl/100 gms. silica | 250 | 95 |
| Silica gel plus 0.002 equivs. KCl/100 gms. silica | 620 | |
| Silica gel plus 0.02 equivs. KCl/100 gms. silica | 330 | 98 |

Example 6

A KCl-containing catalyst was made by treating the large pore silica gel of Example 4 with aqueous potassium chloride as follows:

The gel (1400 parts by weight) was stirred with 2260 parts of water containing about 22 parts by weight of potassium chloride for twenty minutes, and the excess water then removed by filtration. The wet catalyst was dried overnight in a stream of dry nitrogen, then for 16 hours at 110° C. in an oven and finally for 2 hours at 200° C. The final dried catalyst had a potassium chloride content of 1.5% by weight. The catalyst was then charged to a tubular reactor and the drying continued in situ at the reaction temperature.

A series of processes was carried out in which the chlorinated $C_{10}$–$C_{13}$ paraffin feed described in Example 3 was dehydrochlorinated at atmospheric pressure. The hydrogen chloride recovered and the residual chlorine content of the residual liquid product were measured, results being shown in Table 4, together with the space velocities and temperatures used.

TABLE 4

| Dehydrochlorination Conditions: | | | | | | |
|---|---|---|---|---|---|---|
| Temperature, °C | 300 | 300 | 300 | 370 | 370 | 370 |
| Space Velocity, v./v./hr | 0.17 | 0.67 | 1.3 | 0.17 | 0.67 | 1.3 |
| Percent of chlorine content of feed eliminated as HCl | 99.2 | 94.9 | 93.0 | 99.0 | 99.3 | 98.6 |
| Wt. Percent $Cl_2$ in total liquid product | 0.034 | 0.21 | 0.29 | 0.04 | 0.03 | 0.06 |

In no case did the liquid products show any appreciable formation of skeletal isomers.

*Example 7*

A number of catalysts were made by impregnating the silica gel of Example 1 with various amounts of alkali metal hydroxides using the method described in Example 1. These catalysts were used to dehydrochlorinate secondary chloropentane at a temperature of 380–390° C., at atmospheric pressure and with a chloropentane feedrate of 0.125 volume of liquid chloropentane per volume of catalyst per hour. 10 moles of inert gas per mole of chloropentane were fed at the same time. The products were isolated and analysed in the manner described in Example 2, the results obtained being summarised in the following Table 5.

TABLE 5

| Catalyst | Percent of Branched Chain Pentene in Dehydrochlorinated Product | Cracking of $C_5$ Occurring |
|---|---|---|
| Silica gel, no alkali hydroxide added | 6.5 | None detected. |
| Silica gel with 0.02 equiv. NaOH per 100 gm. catalyst | Nil | Do. |
| Silica gel with 0.002 equiv. KOH per 100 gm. catalyst | 2.7 | Do. |
| Silica gel with 0.02 equiv. KOH per 100 gm. catalyst | Nil | Do. |

Substantially complete dehydrochlorination was achieved in all the tests.

*Example 8*

The catalyst preparation and tests of Example 7 were repeated using the silica gel of Example 2, and adding 0.06 equivalent of lithium hydroxide to the silica. This catalyst gave substantially complete dehydrochlorination of secondary chloropentane, and the product contained only a trace of branched chain pentenes compared with 11.2% when the untreated gel was used. A significant amount of cracking products of lower molecular weight occurred with the un-treated silica gel; no cracking was detected with the lithium hydroxide treated catalyst.

*Example 9*

A $C_{10}-C_{13}$ normal paraffin fraction containing 97% of normal paraffins was chlorinated to a chlorine content of 4.19 wt. percent. The hydrogen chloride-free product was dehydrochlorinated in an experimental adiabatic reactor charged with 6 litres of a catalyst prepared from the large pore gel of Example 1 and containing 0.011 equiv. KOH per 100 gms. catalyst. The chlorinated feedstock was pumped through a preheater and raised to a temperature of 380° C. before entering the reactor, the total liquid feedrate being 3 litres per hour. The pressure at the reactor outlet was substantially atmospheric. The liquid product was condensed and stripped of hydrogen chloride by a stream of inert gas, which was recirculated after water scrubbing to remove hydrogen chloride and drying. The liquid hydrocarbon product had the olefin content expected from elimination of the chlorine content as hydrogen chloride, and 96% of the chlorine content was eliminated. A sample of the hydrocarbon product was completely hydrogenated, and on analysis showed no significant differences in skeletal structure compared with the normal paraffin feed; that is no appreciable skeletal isomerisation occurred during the chlorination/dehydrochlorination steps.

*Example 10*

A catalyst was prepared from the large pore silica gel of Example 1 by impregnation with KOH to give a catalyst containing 1% by wt. of KOH. A $C_{10}-C_{13}$ paraffin feedstock was chlorinated to convert 20% of the normal paraffin and processed over this catalyst at a temperature of 350° C., at atmospheric pressure and at a total liquid feed rate of 1.3 volumes per volume of catalyst per hour. Elimination of about 94–95% of the chlorine content of the feed was obtained under these conditions, yielding an olefin/paraffin mixture which showed no appreciable formation of skeletal isomers. After processing about 50 parts of alkylchloride per part of catalyst (by weight) the conversion began to fall slightly, and the reactor was purged with inert gas and the catalyst regenerated with air at a temperature of 480° C. for 5 hours.

Processing of the same feedstock was then resumed at a temperature of 370° C. and a flow rate of 0.67 v./v./ hour, giving about 95% elimination of chlorine and producing a product of the same characteristics as in the first part of the run. The test was continued until a further 60 parts of alkyl chloride per part of catalyst had been processed without significant decline in catalyst activity.

The bulked olefin-paraffin product from this test after removal of hydrogen chloride was alkylated to benzene in the conventional way using anhydrous hydrogen fluoride as catalyst, and the alkylbenzene product recovered by fractionation (in yield equivalent to 116 parts alkylbenzene per 100 parts of normal paraffin consumed). This alkylbenzene was converted to the sodium sulphonate by the usual oleum sulphonation technique, and the biodegradability tested in two ways. Incubation for 21 days in closed vessels of a solution of the sulphonate (3–5 p.p.m.) in river water seeded with sewage effluent (5 ml./ litre of solution) resulted in biological degradation of 96.4% of the active agent, a commercial "soft" product giving 92.9% degradation in the same test. On aeration for 21 days of solutions containing 10 p.p.m. of active agent in seeded river water the dehydrochlorination product gave 3.2% of undegraded active agent and the commercial "soft" material 7.1%.

I claim:

1. A process for the production of olefines which comprises bringing a chlorinated normal paraffin having between 4 and 20 carbon atoms into contact with a silica gel catalyst at an elevated temperature, said catalyst having been pre-treated with an alkali metal compound prior to contact with the paraffin, and recovering the olefine formed.

2. A process according to claim 1 wherein the alkali metal compound is an hydroxide, a carbonate or an halide.

3. A process according to claim 2 wherein the alkali metal compound is an aqueous solution of sodium hydroxide, potassium hydroxide, sodium chloride or potassium chloride.

4. A process according to claim 1 wherein the catalyst contains from about 0.001 to about 0.25 gram equivalent of alkali metal compound per 100 grams of catalyst after pre-treatment.

5. A process according to claic 1 wherein the catalyst contains from about 0.01 to about 0.20 gram equivalent of alkali metal compound per 100 grams of catalyst after pre-treatment.

6. A process according to claim 1 wherein the paraffin is a chlorinated normal paraffin fraction having at least 9 and not more than 18 carbon atoms.

7. A process according to claim 1 wherein the paraffin is a chlorinated normal paraffin fraction having at least 10 and not more than 16 carbon atoms.

8. A process according to claim 1 wherein the paraffin has been chlorinated to less than 40% conversion to chlorinated products.

9. A process according to claim 1 wherein the reaction is carried out in the presence of an inert diluent.

10. A process according to claim 9 wherein the inert diluent is a lower paraffin hydrocarbon.

11. A process according to claim 1 wherein the reaction is carried out in the vapor phase.

12. A process according to claim 11 wherein the temperature is in the range of from 200° C. to 500° C.

13. A process according to claim 12 wherein the temperature is in the range of from 300° C. to 400° C.

14. A process for the production of olefines which comprises bringing a chlorinated normal paraffin having between 4 and 20 carbon atoms into contact with a silica gel catalyst at an elevated temperature, said catalyst having been pre-treated with an aqueous solution of potassium chloride or potassium hydroxide prior to contact with the paraffin, and recovering the olefine formed.

15. A process for the production of olefines which comprises bringing a chlorinated normal paraffin having between 4 and 20 carbon atoms into contact with a silica gel catalyst having an average pore diameter over 40 A. at a temperature in the range of from 300° C. to 400° C., said catalyst having been pre-treated with an aqueous solution of potassium chloride or potassium hydroxide prior to contact with the parafin, and recovering the olefine formed.

References Cited

UNITED STATES PATENTS 2,920,122   1/1960   Milton et al. _____ 260—677

DELBERT E. GANTZ, *Primary Examiner.*

ALPHONSO D. SULLIVAN, *Examiner.*